(12) United States Patent
Vignotto et al.

(10) Patent No.: US 6,974,136 B2
(45) Date of Patent: Dec. 13, 2005

(54) SEALING DEVICE FOR A WHEEL HUB GROUP

(75) Inventors: Angelo Vignotto, Turin (IT); Andrea Griseri, Turin (IT); Alfredo Monetti, Pinerolo (IT); Claudio Savarese, Airasca (IT)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 10/781,465

(22) Filed: Feb. 17, 2004

(65) Prior Publication Data

US 2004/0217551 A1     Nov. 4, 2004

(30) Foreign Application Priority Data

Feb. 17, 2003   (IT)   ............... TO2003A0116

(51) Int. Cl.$^7$ ............................................. F16J 15/32
(52) U.S. Cl. ...................... 277/549; 277/571; 277/572
(58) Field of Search ................................ 277/549, 571, 277/572

(56) References Cited

U.S. PATENT DOCUMENTS 5,975,767 A * 11/1999 Mizukoshi et al. ......... 384/544
6,170,992 B1 * 1/2001 Angelo et al. .............. 384/477
2003/0057651 A1 * 3/2003 Nantua et al. .............. 277/351

* cited by examiner

Primary Examiner—Enoch E. Peavey
(74) Attorney, Agent, or Firm—Merchant & Gould P.C.

(57) ABSTRACT

Sealing device (1) for a wheel hub group (2) connected to the differential (3) of a vehicle, and provided with a rolling bearing (9), the sealing device (1) being mounted in such a way as to protect the bearing (9) from a lubricating fluid for the lubrication of the differential (3), and presenting a first shield (22) which is integral with an outer race (10) of the bearing (9), a second shield (23) which is arranged inside the first shield (22) and which is integral with an inner race (11) of the bearing (9) and which faces the first shield (22) itself, and a dynamic sealing element (24) which is interposed between the first and second shields (22, 23); the second shield (23) being defined by a support portion (25) made of metallic material and force fit onto the inner race (11) and a cylindrical encoder (27) which is integral with the support portion (25), and the first shield (22) being made of metallic material lined with rubber material, and being provided with a loophole (38) which is suitable for being engaged by a reading sensor (39) for reading a signal generated by the encoder (27) itself.

13 Claims, 2 Drawing Sheets

SEALING DEVICE FOR A WHEEL HUB GROUP

The present invention relates to a sealing device for a wheel hub group.

The present invention may be advantageously, but not exclusively, applied in the field of wheel hub groups which are connected to the differential of a vehicle, and provided with rolling bearings, and in which the sealing device is mounted in such a way as to protect the rolling bearing on an inner side of the bearing, or rather on a side of the bearing which is turned towards the differential.

The description which follows will refer, in the interest of providing an example, to this specific application, without however losing any of its general nature.

In the application which has just been described above, the wheel hub group and the differential are connected to each other by means of an axle shaft, which is arranged inside a sealing housing which extends from the differential as far as the wheel hub group, and which is substantially immersed in a lubricating fluid which is contained inside the sealing housing for the lubrication of the differential and the axle shaft themselves. Furthermore, the sealing device comprises, in its more generic form, a shield which is force fit onto an outer race of the bearing, a second shield which is force fit onto an inner race of the bearing and which faces the first shield, and a dynamic sealing element which is interposed between the first and second shields.

The recent technological advances in the field of wheel hub groups have lead to the implementation in such groups of devices, such as encoders, for indicating the kinematic functioning parameters of the wheel hub groups themselves, such devices normally being integrated into the above described sealing devices in such a way that they are rendered integral to one of the two shields, generally the more outer of the two shields in relation to the bearing.

In the above-described application, however, it has been revealed that the metallic contaminating agents which are inevitably to be found in the lubricating fluid can cause some disadvantages which, in some cases, can have a detrimental effect on the quality of the signal which is emitted by the encoder.

The aim of the present invention is to produce a sealing device for a wheel hub group, which will permit the use of an encoder in an application such as the one described above, but which will not present the disadvantages which have been indicated above.

According to the present invention, a sealing device will be produced for a wheel hub group connected to a differential device, and provided with a rolling bearing, the sealing device being mounted in such a way as to protect the bearing from a lubricating fluid for the lubrication of the differential, and comprising a first shield which is integral with an outer race of the bearing, a second shield which is integral with an inner race of the bearing and which faces the first shield, and a dynamic sealing element which is interposed between the first and second shields; the sealing device being characterised by the fact that the second shield is arranged internally to the first shield in relation to the bearing, and comprises a support portion which is made of metallic material and which is force fit onto the inner race and an external portion which is provided with a cylindrical encoder which is integral with the support portion; the first shield comprising a first cylindrical portion which is made of metallic material and which is force fit onto the outer race in a position which is at least coaxial to the encoder, and which is provided with at least one slit which is suitable for being engaged by a sensor for reading a signal which is generated by the encoder itself.

The invention will now be described with reference to the attached drawings, which illustrate a non-limiting form of embodiment of the present invention, and in which.

Figure 1:
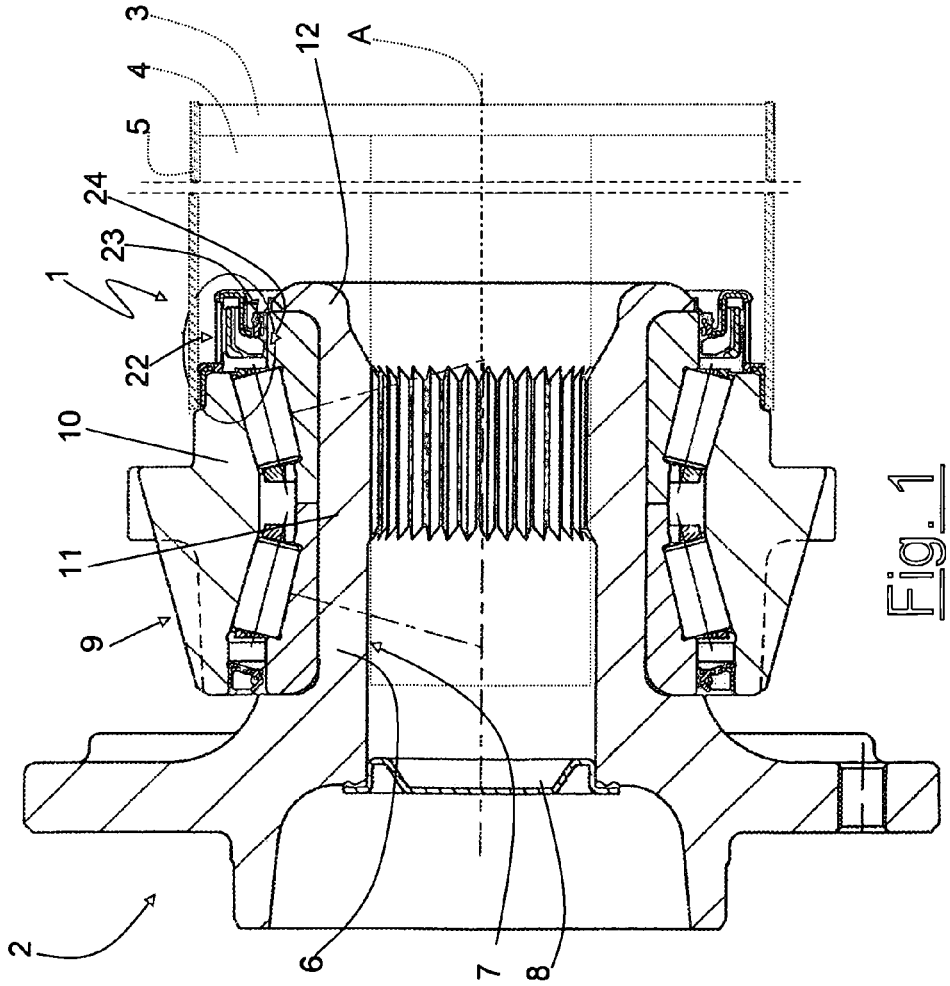
FIG. 1 is a section view, with some parts schematised for reasons of clarity, of a preferred form of embodiment of the sealing device for a wheel hub group.
Figure 4:
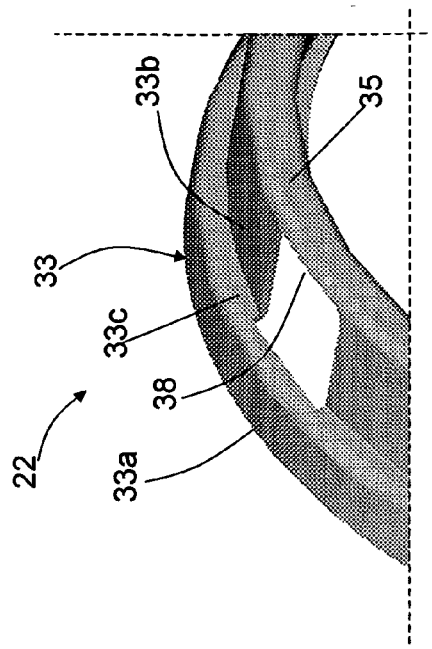
FIG. 4 is a schematised perspective view, on a reduced scale and with some parts removed for reasons of clarity, of a detail shown in FIG. 3.

With reference to FIG. 1, the number one indicates, in its entirety, a sealing device for a wheel hub group 2.

The group 2 is suitable for being connected to a vehicle differential 3 by means of an axle shaft 4, which is arranged inside a sealing box/house/case 5 which extends from the differential 3 as far as the group 2, and is substantially immersed in a lubricating fluid which is contained inside the housing 5 for the lubrication of the differential 3 and the axle shaft 4 themselves.

The group 2 presents a longitudinal axis A, and comprises a tubular body 6 which is internally crossed by a cylindrical passing housing 7, which is coaxial to the axis A, and is engaged in an axially sliding, but angularly integral, manner by a grooved terminal portion of the axle shaft 4. The group 2 also comprises a sealing plug 8 which is arranged in such a way as to close the housing 7, and a rolling bearing 9, which is mounted on the tubular body 6, and which comprises in turn a fixed outer race 10 and a rotatable inner race 11 which is axially blocked onto the tubular body 6 by means of a rolled blocking border 12 of the tubular body 6 itself.

The race 10 is axially delimited, on the part turned towards the differential 3, or rather the inner part of the group 2, by an outer annular surface 13 which is transverse to the axis A, and is radially delimited towards the outside, at least on the part turned towards the differential 3, by an outer cylindrical surface 14 which is transverse and contiguous to the surface 13.

The race 11 axially projects in relation to the race 10, and is axially delimited by an outer annular surface 15 which is transverse to the axis A and arranged against the border 12, and is radially delimited towards the outside, at least on the part turned towards the differential 3, by an outer. cylindrical surface 16 which is transverse and contiguous to the surface 15. The surface 15 is axially staggered in relation to the surface 13, while both the surface 14 and the surface 16 are coaxial to the axis A, and are engaged by the device 1 in order to block the device 1 itself to the bearing 9, in such a way as to arrange the device 1 so that it protects the bearing 9 from the lubricating fluid for the lubrication of the differential 3.

Figure 2:
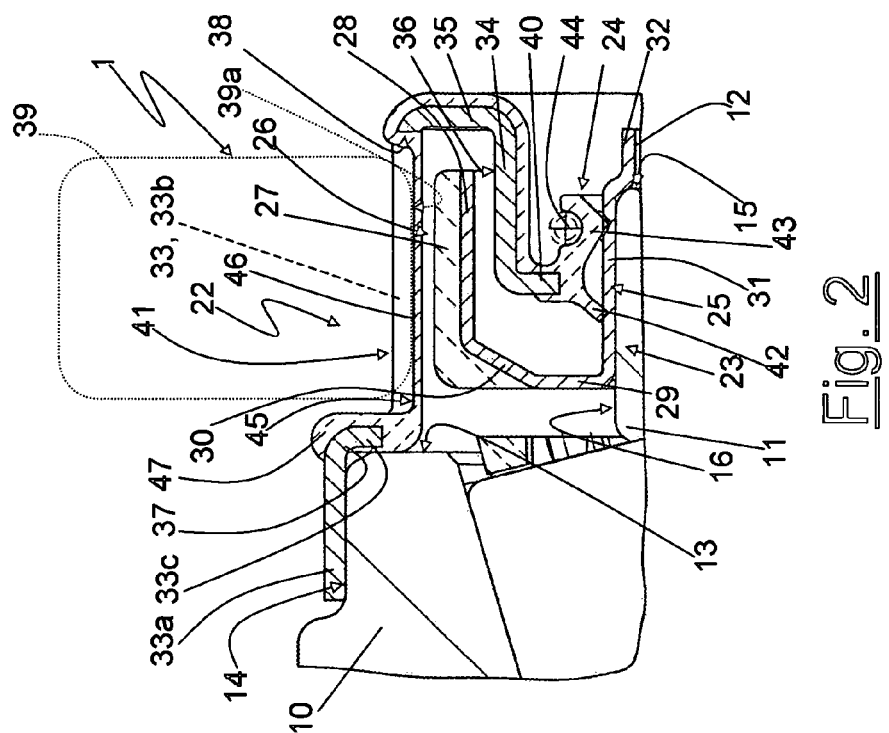
FIG. 2 illustrates, in section and on an enlarged scale, a detail of the device shown in FIG. 1.
Figure 3:
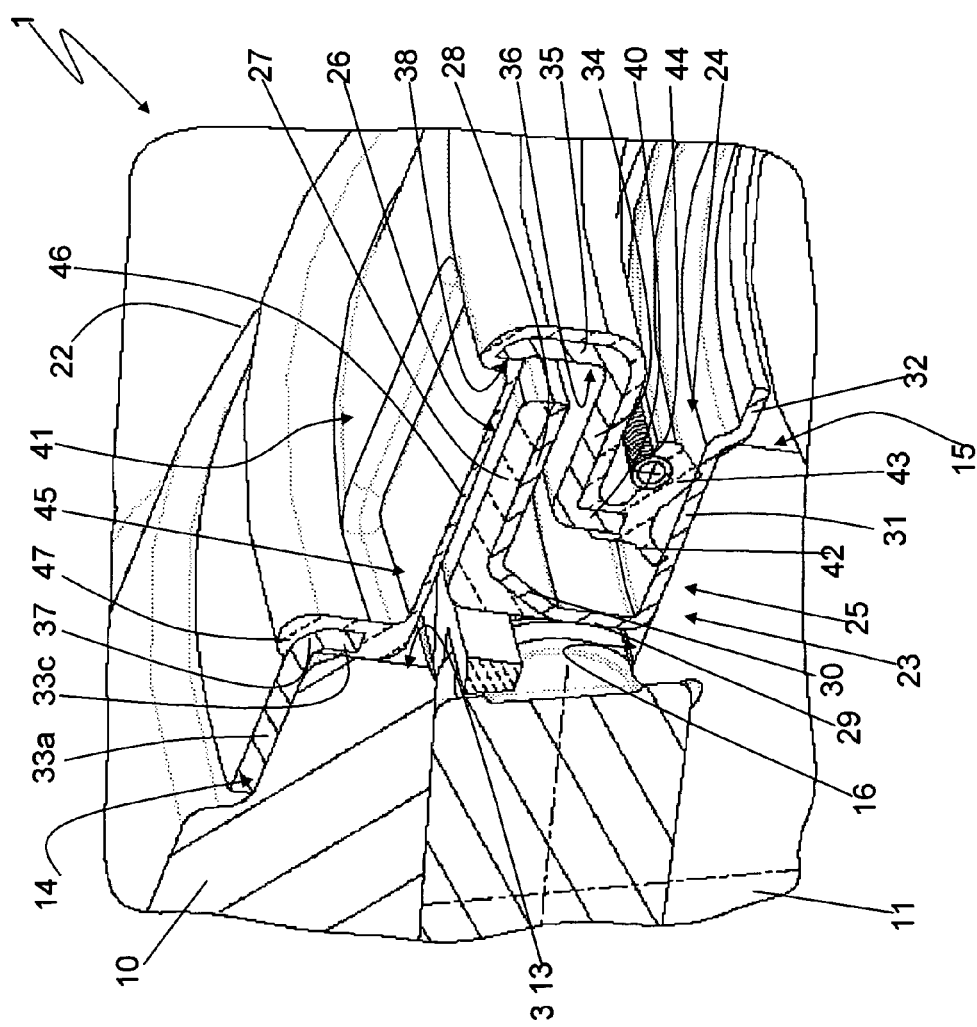
FIG. 3 illustrates, in perspective view and on an enlarged scale, a detail of the device shown in FIG. 1.

As is better illustrated in FIGS. 2 and 3, the device 1 comprises a shield 22 which is integral with the race 10, a shield 23 which is integral with the race 11 and which faces the shield 22, and a dynamic sealing element 24 which is interposed between the two shields 22 and 23.

The shield 23 is arranged internally to the shield 22 in relation to the bearing 9, and it comprises a support portion 25 which is made from metallic material and is force fit onto the surface 16 of the race 11, and an outer portion 26, which is integral with the portion 25, and which is provided with a cylindrical encoder 27, a cylindrical wall 28 which is integral with the encoder 27 and which is radially arranged towards the inside in relation to the encoder 27 itself, and a shaped connection flange 29 between the wall 28 and the portion 25 themselves.

In particular, the flange 29 is transverse to the portion 25 and presents, on the side of the encoder 27, a substantially tapering wall 30.

The encoder 27 is made of magnetic material, for example elastomeric rubber or plastic, and is radially arranged towards the outside of the walls 28 and 30.

Furthermore, the portion 25 comprises a cylindrical wall 31 which is force fit onto the surface 15, and an external border 32 which is axially arranged towards the outside of the bearing 9, and which has a diameter which is less than a diameter of the wall 31 in order to define both an axial striker on the race 11 and a static seal on the border 12.

The shield 22 comprises an outer cylindrical wall 33 which is arranged in at least a coaxial position to the encoder 27, and an inner cylindrical wall 34 which is integral with the wall 33, and which is radially arranged opposite the encoder 27 itself in relation to the wall 33 itself. The wall 33 and the wall 34 are both made from metallic material, and they are rendered integral with each other by means of an annular wall 35, which is arranged transverse to the axis A, and which defines with the walls 33 and 34 themselves a toroidal chamber 36 substantially inside which is arranged the encoder 27.

Furthermore, the wall 33 comprises two cylindrical portions 33a and 33b which have different diameters in relation to each other, and an annular connecting portion 33c which connects the two cylindrical portions 33a and 33b, and of which the cylindrical portion 33a is force fit onto the surface 13, and defines with the annular portion 33c a rounded edge 37 which is arranged so as to abut the surfaces 13 and 14. The cylindrical portion 33b, instead, entirely faces the encoder 27, and is provided with a slit 38 which is suitable for being engaged by a sensor 39 for reading a signal which is generated by the encoder 27 itself. In order to facilitate the mounting of the device 1 onto the bearing 9, the cylindrical portion 33b may however be provided with further slits 38 which are uniformly distributed around the axis A.

The wall 34 presents, on the part opposite the wall 35, a support border 40, which is radially folded towards the axis A, and which defines a support for the element 24.

Finally, the shield 22 comprises a lining 41 made of rubber material, which is arranged outside the shield 22 itself, and which completely lines the annular portion 33c, the cylindrical portion 33b, the annular wall 35, the wall 34, and the border 40, from which it departs in order to define the sealing element 24, which in a case of this kind is defined by two lips 42 and 43, of which the lip 42 axially extends towards the inside of the bearing 9 and is arranged in sliding contact on the wall 31, while the lip 43 axially extends towards the outside of the bearing 9, and is also arranged in sliding contact on the wall 31, but is also provided with an annular spring 44 in order to increase the sealing effect on the wall 31 itself.

The lining 41 completely occludes the slit 38 by being inserted inside it in order to define a depression 45 which is of a substantially quadrangular shape, which is limited at the bottom by a thin baffle 46 which is made of the same material as the lining, and which is suitable for housing the sensor 39 in its interior. In particular, the baffle 46 directly faces the encoder 27 and the sensor 39 is positioned inside the depression 45 in such a way that one of its own reading surfaces 39a is arranged in direct contact with the baffle 46.

In this way, not only is the surface 39a arranged in a position which is very near the encoder 27 with the advantage of minimising the air gap between the sensor 39 and the encoder 27 themselves, but, above all, the surface 39a is also arranged in contact with the baffle 46 by which it is protected from the metallic contaminating agents which are inevitably present in the lubricating fluid.

Finally, the lining 41 comprises a static sealing element 47, which is arranged around the whole edge 37 in order to produce a static seal with the housing 5 in such a way as to also avoid any leaks of lubricating fluid from the housing 5 itself, and which is defined by a rounded projection which has an outer diameter which is greater than the diameter of the cylindrical portion 33a.

From the above description, it is evident that the particular conformation of the shields 22 and 23 permit the complete isolation of the encoder 27 from the outside, preventing any contamination whatsoever of the encoder 27 by the metallic contaminating agents which are present in the lubricating fluid, and equally permitting the protection of at least the reading surface 38a of the sensor 38 itself.

It is intended that the present invention should not be limited to the forms of embodiment herein described and illustrated, which are to be considered as examples of forms of embodiment of the sealing device for a wheel hub group, which might instead be subject to further modifications relating to the shape and disposition of its parts and details pertaining to its construction and assembly.

What is claimed is:

1. Sealing device for a wheel hub group connected to a differential device, and provided with a rolling bearing, the sealing device being mounted in such a way as to protect the bearing from a lubricating fluid for the lubrication of the differential, the sealing device comprising:
   a first shield which is integral with a outer race of the bearing,
   a second shield which is integral with an inner race of the bearing and which faces the first shield, and
   a dynamic sealing element which is interposed between the first and second shields:
   wherein the second shield is arranged internally to the first shield in relation to the bearing, and comprises:
      a support portion which is made of metallic material and which is force fit onto the inner race, and
      an external portion which is provided with a cylindrical encoder which is integral with the support portion; and
   wherein the first shield comprises:
      a first cylindrical portion which is made of metallic material and which is force fit onto the outer race in a position which is at least coaxial to the encoder, and is provided with at least one slit for being engaged by a sensor for reading a signal generated by the encoder.

2. Sealing device according to claim 1, wherein the first shield comprises a second cylindrical portion which is made of metallic material, and which is integral with the first cylindrical portion and which is radially arranged opposite the encoder in relation to the first cylindrical portion.

3. Sealing device according to claim 2, wherein the first shield comprises a lining which is made of rubber material and which is arranged at least outside the first and second cylindrical portions and in such a way as to totally close the slit.

4. Sealing device according to claim 3, wherein the lining comprises a base baffle, which closes the slit, and which separates and seals the encoder from the outside of the device.

5. Sealing device according to claim 4, wherein the baffle is suitable for being placed in contact with a reading surface of the sensor for monitoring the signal generated by the encoder.

6. Sealing device according to claim 3, wherein the dynamic sealing element is integral with the lining and is also integral with the second cylindrical portion.

7. Sealing device according to claim 6, wherein the second cylindrical portion comprises a support border for the dynamic sealing element; the support border being radially turned towards the inside.

8. Sealing device according to claim 7, wherein the first cylindrical portion comprises two cylindrical bodies which have different diameters from each other, and a connecting annular body which connects the two cylindrical bodies; a first cylindrical body of the two cylindrical bodies being force fit onto the outer race and defining with the annular body an edge which is arranged in such a way as to abut the outer race.

9. Sealing device according to claim 8, wherein the lining comprises a static sealing element which is arranged around the edge in order to create a static seal with a sealing housing which extends from the differential as far as the wheel hub group.

10. Sealing device according to claim 9, wherein the static sealing element is defined by a rounded edge with an external diameter which is greater than the diameter of the first cylindrical body.

11. Sealing device according to claim 1, wherein the support portion comprises an axially external border which has a reduced diameter and which defines both an axial striker on the inner race, and a static seal on a rolled blocking border of the inner race.

12. Sealing device according to claim 11, wherein the external support portion comprises a cylindrical wall which is integral with the encoder and which is radially arranged towards the inside in relation to the encoder and a substantially tapering wall which is integral with the encoder.

13. Sealing device according to claim 1, wherein it is mounted onto a wheel hub group which is provided with an internal cylindrical passing housing and closed on an external side by a sealing plug; the cylindrical housing being suitable for being engaged in an axially sliding fashion by a terminal portion of an axle shaft which projects from the differential.

* * * * *